(12) United States Patent
Li et al.

(10) Patent No.: US 11,169,433 B2
(45) Date of Patent: Nov. 9, 2021

(54) LIGHT SOURCE MODULE AND PROJECTION APPARATUS

(71) Applicants: Coretronic Corporation, Hsin-Chu (TW); Coretronic Projection (Kunshan) Corporation, Jiangsu (CN)

(72) Inventors: Shih-Yao Li, Hsin-Chu (TW); Yu-Wei Guo, Hsin-Chu (TW); Chun-Ting Lin, Hsin-Chu (TW)

(73) Assignees: Coretronic Corporation, Hsin-Chu (TW); Coretronic Projection (Kunshan) Corporation, Jiangsu (CN)

(*) Notice: Subject to any disclaimer, the term of this patent is extended or adjusted under 35 U.S.C. 154(b) by 72 days.

(21) Appl. No.: 16/551,716

(22) Filed: Aug. 27, 2019

(65) Prior Publication Data
US 2021/0063851 A1 Mar. 4, 2021

(51) Int. Cl.
*G03B 21/16* (2006.01)
*G03B 21/20* (2006.01)

(52) U.S. Cl.
CPC ......... *G03B 21/16* (2013.01); *G03B 21/2013* (2013.01)

(58) Field of Classification Search
CPC ........... G03B 21/16; F21S 45/40; F21V 29/00
USPC .......... 353/57, 60, 61; 362/345, 373
See application file for complete search history.

(56) References Cited

U.S. PATENT DOCUMENTS

| | | | | |
|---|---|---|---|---|
| 7,914,152 B2 * | 3/2011 | Li | ...... | G03B 21/2033 353/54 |
| 8,226,243 B2 * | 7/2012 | Chen | ...... | G03B 21/16 353/52 |
| 8,439,543 B2 * | 5/2013 | Tanaka | ...... | F21V 29/75 362/547 |
| 9,952,487 B2 * | 4/2018 | Lin | ...... | G03B 21/16 |
| 2006/0203206 A1 * | 9/2006 | Kim | ...... | G03B 21/16 353/58 |
| 2007/0253202 A1 * | 11/2007 | Wu | ...... | F21V 29/767 362/294 |
| 2010/0053567 A1 * | 3/2010 | Lian | ...... | G03B 21/26 353/61 |
| 2016/0330419 A1 * | 11/2016 | Lin | ...... | G03B 21/145 |

FOREIGN PATENT DOCUMENTS

| | | |
|---|---|---|
| TW | M486786 | 9/2014 |
| TW | I596465 | 8/2017 |

\* cited by examiner

*Primary Examiner* — William C. Dowling
(74) *Attorney, Agent, or Firm* — JCIPRNET

(57) ABSTRACT

A light source module comprises a first light source, a second light source, a first heat sink structure, and a second heat sink structure. The second light source disposed downstream of a main airflow flowing through the first light source module. The first heat sink structure has a plurality of first heat sink fins. The second heat sink structure has a plurality of second heat sink fins, wherein the first light source and the second light source are disposed along a first direction. The first heat sink structure and the second heat sink structure are disposed along the first direction, the first heat sink fins are arranged along the first direction, the second heat sink fins are arranged along a second direction, and the first direction is different from the second direction. A projection apparatus comprising the light source module is also provided.

19 Claims, 3 Drawing Sheets

LIGHT SOURCE MODULE AND PROJECTION APPARATUS

BACKGROUND

Technical Field

The invention relates to an optical module and a display device having the optical module. More particularly, the invention relates to a light source module and a projection apparatus having the light source module.

Description of Related Art

Projectors are display devices configured to generate frames of large sizes. According to the imaging principle of projectors, an illumination beam generated by a light source is converted into an image beam through a light valve, and the image beam is then projected unto a screen or a wall through a projection lens.

With the need for high brightness, color, and high resolution, the power requirements of a projector is increasing. In addition, small size, low noise and good thermal design are also indicators. In particular, the heat dissipation of the electronic elements of the projector is very important. In most cases, when the temperature is low, the electronic elements have a longer life and the better performance. Choosing the appropriate heat sink for different heat sources will determine the system size of the projector. However, integrating multiple heat sources in the system design of the projector will make the problem more complicated. In detail, in the system of the projector, it needs to be considered (1) the heat generation and temperature resistance of multiple heat sources; (2) system configuration; and (3) airflow design. Therefore, how to design the arrangement of the heat sources and the heat sink structures in the system of the projector to achieve the purpose of lowest impedance, maximum airflow and effective cooling of the heat sources becomes an important issue.

The information disclosed in the Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides a light source module and a projection apparatus with good heat dissipation effect to prevent thermal effects from affecting optical components and thereby improving optical effects.

Other objects and advantages of the invention can be further illustrated by the technical features broadly embodied and described as follows.

In order to achieve one or part of or all of the features, an embodiment of the invention provides a light source module configured to provide an illumination beam. The light source module comprises a first light source, a second light source, a first heat sink structure, and a second heat sink structure. The second light source disposed downstream of a main airflow flowing through the first light source module. The first heat sink structure connected to the first light source, and having a plurality of first heat sink fins. The second heat sink structure connected to the second light source, and having a plurality of second heat sink fins, wherein the first light source and the second light source are disposed along a first direction. The first heat sink structure and the second heat sink structure are disposed along the first direction, the plurality of first heat sink fins are arranged along the first direction, the plurality of second heat sink fins are arranged along a second direction, and the first direction is different from the second direction.

In order to achieve one or part of or all of the features, an embodiment of the invention provides a projection apparatus. The projection apparatus comprises a light source module, a light valve, and a projection lens. The light source module is configured to provide an illumination beam. The light source module comprises a first light source, a second light source, a first heat sink structure, and a second heat sink structure. The second light source disposed downstream of a main airflow flowing through the first light source module. The first heat sink structure connected to the first light source, and having a plurality of first heat sink fins. The second heat sink structure connected to the second light source, and having a plurality of second heat sink fins, wherein the first light source and the second light source are disposed along a first direction. The first heat sink structure and the second heat sink structure are disposed along the first direction, the plurality of first heat sink fins are arranged along the first direction, the plurality of second heat sink fins are arranged along a second direction, and the first direction is different from the second direction. The light valve is located on a transmission path of the illumination beam and configured to convert the illumination beam into an image beam. The projection lens is located on a transmission path of the image beam and configured to project the image beam to an outside of the projection apparatus.

Based on the above, in the light source module and the projection apparatus of the invention, the first heat sink structure is connected to the first light source, and the second heat sink structure is connected to the second light source. The first heat sink structure has a plurality of first heat sink fins arranged in a first direction, and the second heat sink structure has a plurality of second heat sink fins arranged in a second direction, wherein the first direction is not equal to the second direction. Therefore, when the main airflow in the projection apparatus is transmitted from the upstream to the downstream, the airflow flowing through gaps between the first heat sink fins will be directed by the structure of the first heat sink fin itself to the outside of the first heat sink structure and not transmitted into gaps between the second heat sink fins. In this way, it is ensured that the heat dissipation effects of the first light source and the second light source do not affect each other, and the heat dissipation effect of the respective heat sink structure is increased to prevent the thermal effect from affecting the optical component and thereby improving the optical effect of the light source module and the projection apparatus.

Other objectives, features and advantages of the invention will be further understood from the further technological features disclosed by the embodiments of the invention wherein there are shown and described preferred embodiments of the invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of the specification. The drawings illustrate exemplary embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
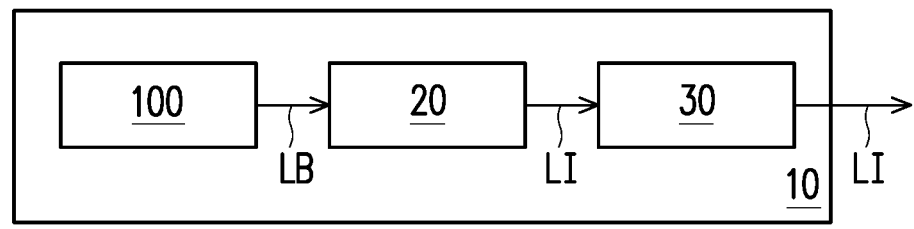
FIG. 1 is a schematic view of a projection apparatus according to an embodiment of the invention.

FIG. 1 is a schematic view of a projection apparatus according to an embodiment of the invention. Please refer to FIG. 1. The projection apparatus 10 of the embodiment includes a light source module 100, a light valve 20 and a projection lens 30. The light source module 100 is configured to provide an illumination beam LB. In detail, in the embodiment, the projection apparatus 10 further includes a circuit structure 40, such as a circuit board. The light valve 20 is configured to convert the illumination beam LB into an image beam LI. The projection lens 30 is configured to project the image beam LI outside the projection apparatus 10.

Figure 2:
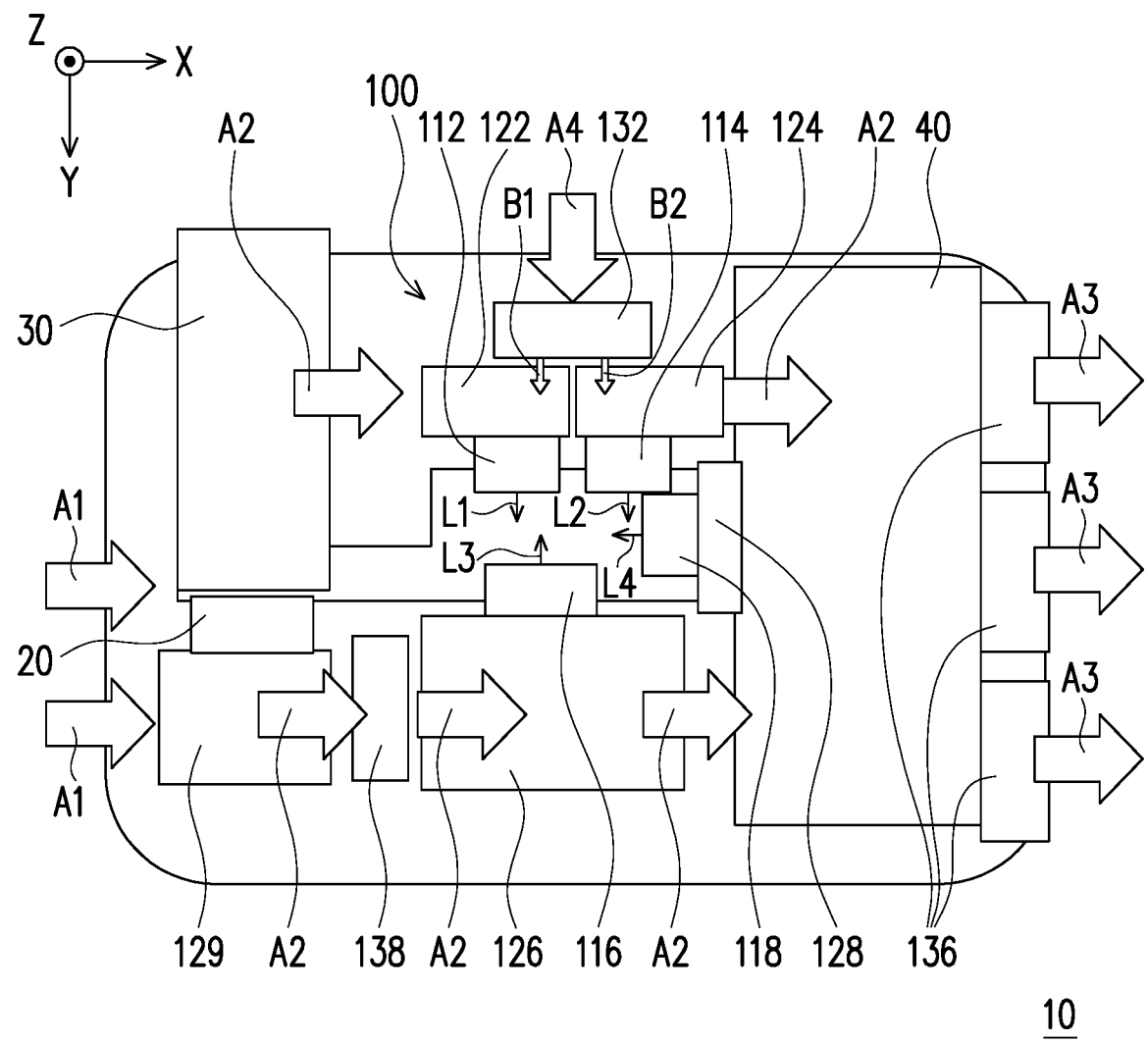
FIG. 2 is a top view of the projection apparatus of FIG. 1.

FIG. 2 is a top view of the projection apparatus of FIG. 1. Please refer to FIG. 2. The light source module 100 includes a first light source 112, a second light source 114, a first heat sink structure 122, and a second heat sink structure 124. In one embodiment, a main airflow A2 flows through the projection apparatus 10 to help the projection apparatus 10 achieve the heat dissipation effect. In the embodiment, the main airflow A2 transmitted in the projection apparatus 10 is generated, for example, by extracting air from the inside of the projection apparatus 10 by at least one third fan 136. In detail, the at least one third fan 136 is disposed on a side of the projection apparatus 10 that faces the positive X-axis direction, and when the at least one third fan 136 extracts air from the inside of the projection apparatus 10 along the positive X-axis direction, the exhausted airflow A3 and the introduced airflow A1 will be generated, thereby causing the main airflow A2 to be formed in the projection apparatus 10. In the embodiment, the number of the at least one third fan 136 is, for example, three, but the invention is not limited thereto.

The first light source 112 is adapted to emit a first light beam L1. For example, the first light source 112 is a first blue light source and is used to emit a first blue light beam. In some embodiments, the first light beam L1 may be green light beam, but the invention is not limited thereto. The second light source 114 is adapted to emit a second light beam L2. In one embodiment, the first light source 112 is located between the second light source 114 and the projection lens 30, and the first light source 112 and the second light source 114 are arranged along a first direction (for example, the direction parallel to the X-axis direction shown in FIG. 2), and the second light source 114 is disposed downstream of the main airflow A2 flowing through the first light source 112. Therefore, the direction of the first light beam L1 is a positive Y-axis direction, and the direction of the second light beam L2 is also a positive Y-axis direction. In other words, the light emitting direction of the first light source 112 is the same as the light emitting direction of the second light source 114.

Figure 3:
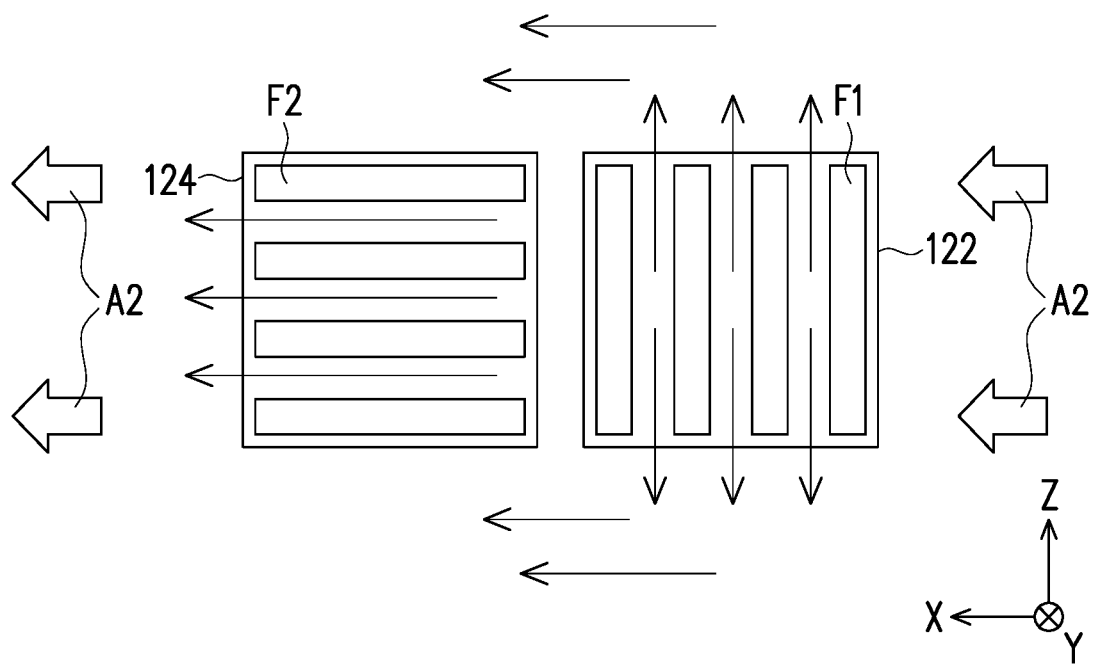
FIG. 3 is a side view of the first heat sink structure and the second heat sink structure of FIG. 2.

FIG. 3 is a side view of the first heat sink structure and the second heat sink structure of FIG. 2. Please refer to FIG. 2 and FIG. 3. The first heat sink structure 122 is connected to the first light source 112, and the first heat sink structure 122 has a plurality of first heat sink fins F1. The second heat sink structure 124 is connected to the second light source 114, and the second heat sink structure 124 has a plurality of second heat sink fins F2. The first heat sink structure 122 and the second heat sink structure 124 are disposed along the first direction, and the first heat sink fins F1 are arranged along the first direction. The second heat sink fins F2 are arranged along a second direction (for example, the direction parallel to the Z-axis direction shown in FIG. 2), and the first direction is different from the second direction. In a preferred embodiment, the angle between the first direction and the second direction is between 85 degrees and 95 degrees. In one embodiment, the angle between the first direction and the second direction is 90 degrees, but the invention is not limited thereto. In other words, each the first heat sink fin F1 extends along the second direction, and each the second heat sink fin F2 extends along the first direction. Therefore, when the airflow is transmitted from the upstream to the downstream (for example, along the direction of the main airflow A2 shown in FIG. 2), the airflow flowing through gaps between the first heat sink fins F1 will be directed by the structure of the first heat sink fins F1 itself to the outside of the first heat sink structure 122 and not transmitted into gaps between the second heat sink fins F2. To be specific, when the airflow enters the gaps between the first heat sink fins F1 from the outside of the first heat sink structure 122, the airflow will be first directed by the structure of the first heat sink fins F1 to flow along the positive Z-axis directions and negative Z-axis directions and flow out of the first heat sink structure 122. Next, the airflow flowing from the gaps between the first heat sink fins F1 is transmitted along with the main airflow A2, flows through the outside of the first heat sink structure 122 and then flows through the outside of the second heat sink structure 124. In this way, it is ensured that the heat dissipation effects of the first light source and the second light source do not affect each other, and the heat dissipation effect of the respective heat sink structures is increased to prevent the thermal effect from affecting the optical component and thereby improving the optical effect of the light source module 100.

Figure 4:
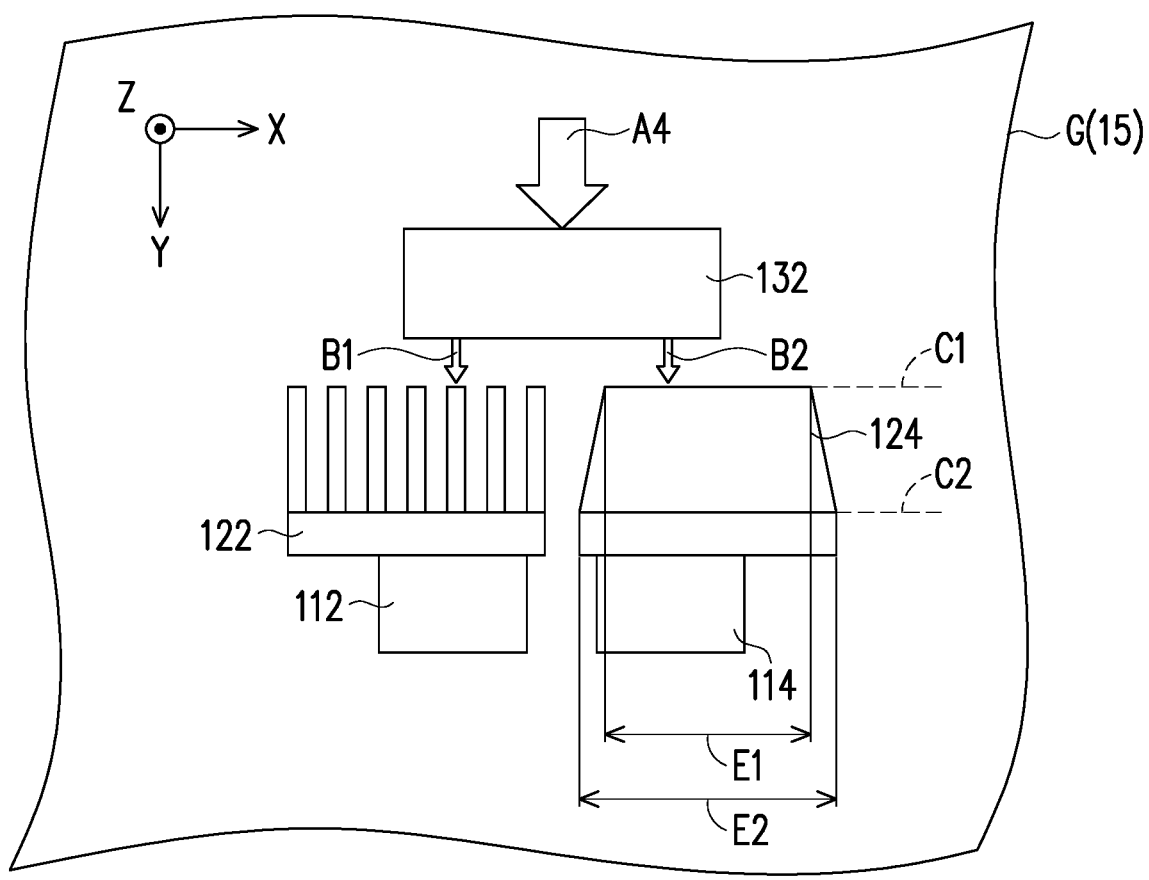
FIG. 4 is a top view of the first heat sink structure and the second heat sink structure of FIG. 2.

FIG. 4 is a top view of the first heat sink structure and the second heat sink structure of FIG. 2. Please refer to FIG. 2 to FIG. 4. In one embodiment, a width E1 of a first side C1 of each of the plurality of second heat sink fins F2 away from the second light source 114 is less than a width E2 of a second side C2 of each of the plurality of second heat sink fins 124 adjacent to the second light source 114. In addition, in one embodiment, the projection apparatus 10 further includes a housing 15, the light source module 100 is configured in the housing 15, and the housing 15 includes a top wall G, and a normal direction of the top wall G (for example, the positive Z-axis direction) is perpendicular to the first direction, an area of an orthogonal projection of the second heat sink structure 124 on the top wall G is smaller than an area of an orthogonal projection of the first heat sink structure 122 on the top wall G. In this way, the area of the second heat sink fins F2 which the airflow flows through can be reduced, and the friction generated by the airflow flowing between the adjacent two second heat sink fins F2 can be further reduced, thereby improving the flow velocity of the second heat sink structure 124 and improving the heat dissipation effect of the second heat sink structure 124 accordingly. In other embodiments, the second heat sink structure 124 can be further adapted to other geometries or configurations that help increase the velocity of the airflow. The invention is not limited to its material, type, size or structural geometry. wherein the light source module comprises a first fan, the first fan is configured to correspond to the first heat sink structure and the second heat sink structure, wherein the first fan provides a portion of an airflow to the first heat sink structure, and provides another portion of the airflow to the second heat sink structure In one embodiment, the light source module 100 further includes a first fan 132 configured to correspond to the first heat sink structure 122 and the second heat sink structure 124. The first fan 132 provides one portion of an introduced airflow A4 to the first heat sink structure 122, and the portion of the introduced airflow A4 is indicated by airflow B1 in FIG. 2 and FIG. 4. The first fan 132 further provides another portion of the introduced airflow A4 to the second heat sink structure 124, and the another portion of the introduced airflow A4 is indicated by airflow B2 in FIG. 2 and FIG. 4. In detail, the first fan 132 is disposed on a side of the projection apparatus 10 that faces the negative Y-axis direction, and when the first fan 132 extracts air from the outside of the projection apparatus 10 along the positive Y-axis direction, the introduced airflow A4 will be generated and then divided into the airflow B1 and the airflow B2. To be specific, the airflow B1 enters the gaps between the first heat sink fins F1 and then heated by the first light source 112, the heated airflow B1 will be first directed by the structure of the first heat sink fins F1 to flow along the positive Z-axis directions and negative Z-axis directions and flow out of the first heat sink structure 122. Next, the heated airflow B1 flowing from the gaps between the first heat sink fins F1 is transmitted along with the main airflow A2, flows through the outside of the first heat sink structure 122 and then flows through the outside of the second heat sink structure 124. Besides, the airflow B2 enters the gaps between the second heat sink fins F2 and then heated by the second light source 114, the heated airflow B2 will be first directed by the structure of the second heat sink fins F2 to flow along the positive X-axis and flow out of the second heat sink structure 124. Next, the heated airflow B2 flowing from the gaps between the second heat sink fins F2 is transmitted along with the main airflow A2. Therefore, the thermal effects of the first heat sink structure 122 and the second heat sink structure 124 can be further increased. Moreover, the airflow delivered in the first heat sink structure 122 is not transferred to the second heat sink structure 124 due to the arrangement of the first fan 132, the first heat sink structure 122 and the second heat sink structure 124, the structure of the first heat sink fins F1 and the second heat sink fins F2, and the main airflow A2 in the projection apparatus 10. In this way, the heat dissipation effect of the light source module 100 can be further improved to prevent the thermal effect from affecting the optical component and thereby improving the optical effect.

In one embodiment, the light source module 100 further includes a third light source 116 and a third heat sink structure 126, and the third heat sink structure 126 is connected to the third light source 116. The third heat sink structure 126 is configured to dissipate the third light source 116. The third light source 116 is adapted to emit a third light beam L3. For example, the third light source 116 is a green light source and is used to emit green light beam. Specifically, the third light source 116 of the embodiment may include a blue light emitting element (eg, a blue light emitting diode element) and a wavelength conversion layer (eg, a phosphor powder layer). The wavelength conversion layer is configured to convert the blue light beam emitted by the blue light emitting element into the green light beam. However, the invention is not limited thereto. In one embodiment, the direction of the third light beam L3 is a negative Y-axis direction. In other words, the direction of the third light beam L3 is opposite to the direction of the first light beam L1. It should be noted that, in the embodiment, the first light source 112 and the third light source 116 are the light sources closest to the projection lens 30, and in another embodiment, the position of the first light source 112 and the position of the third light source 116 may be exchanged, and the invention is not limited thereto.

In one embodiment, the light source module 100 further includes a fourth light source 118 adapted to emit a fourth light beam L4. For example, the fourth light source 118 is a second blue light source and is used to emit a second blue light beam of the same wavelength or different wavelength as the first blue light beam (for example, the first light beam L1), but the invention is not limited thereto. In one embodiment, the direction of the fourth light beam L4 is a negative X-axis direction.

In addition, in one embodiment, a fourth fan 138, a fourth heat sink structure 128, and a fifth heat sink structure 129 may be further selected and configured. The fourth heat sink structure 128 is connected to the fourth light source 118 for dissipating the heat generated by the fourth light source 118. The fifth heat sink structure 129 is connected to the light valve 20 for dissipating the heat generated by the light valve 20. The fourth fan 138 is disposed between the fifth heat sink structure 129 and the third heat sink structure 126 and configured to cause the main airflow A2 to flow to the third heat sink structure 126.

Figure 5:
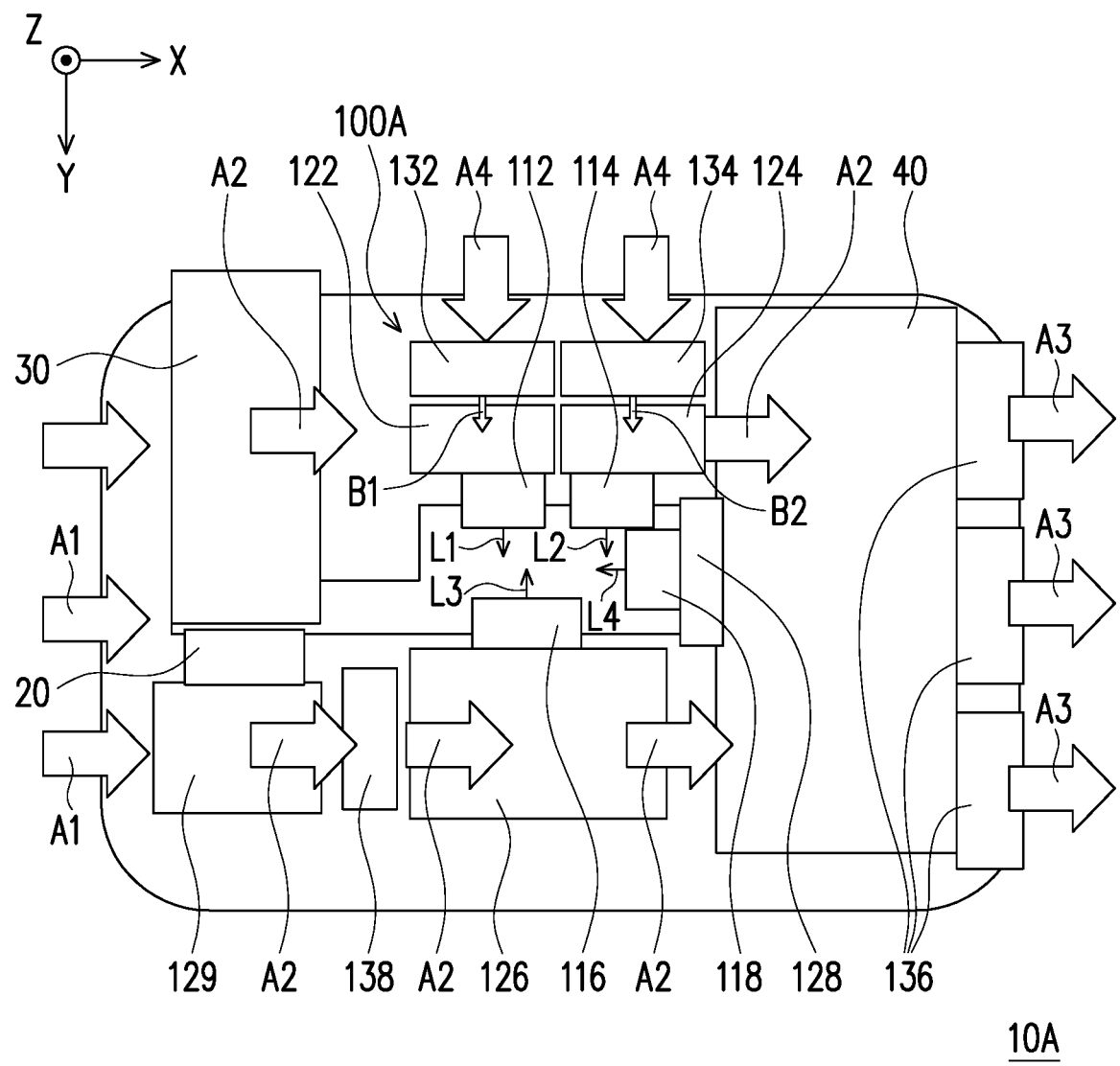
FIG. 5 is a top view of a projection apparatus according to another embodiment of the invention.

FIG. 5 is a top view of a projection apparatus according to another embodiment of the invention. Please refer to FIG. 5. The projection apparatus 10A of the embodiment is similar to the projection apparatus 10 shown in FIG. 2. The difference between the projection apparatus 10A and the projection apparatus 10 is that the light source module 100A configured in the projection apparatus 10A further includes a second fan 134. The first fan 132 and the second fan 134 are respectively disposed at positions corresponding to the first heat sink structure 122 and the second heat sink structure 124, wherein the first fan 132 provides a first airflow (for example, the airflow B1) to the first heat sink structure 122, the second fan 134 provides a second airflow (for example, airflow B2) to the second heat sink structure 124. In this way, the heat dissipation effect of the light source module 100A can be further improved to prevent the thermal effect from affecting the optical component and thereby improving the optical effect.

In summary, in the light source module and the projection apparatus of the invention, the first heat sink structure is connected to the first light source, and the second heat sink structure is connected to the second light source. The first heat sink structure has a plurality of first heat sink fins arranged in a first direction, and the second heat sink structure has a plurality of second heat sink fins arranged in a second direction, wherein the first direction is not equal to the second direction. Therefore, when the main airflow in the projection apparatus is transmitted from the upstream to the downstream, the airflow flowing through gaps between the first heat sink fins will be directed by the structure of the first heat sink fin itself to the outside of the first heat sink structure and not transmitted into gaps between the second heat sink fins. In this way, it is ensured that the heat dissipation effects of the first light source and the second light source do not affect each other, and the heat dissipation effect of the respective heat sink structure is increased to prevent the thermal effect from affecting the optical component and thereby improving the optical effect of the light source module and the projection apparatus.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in the art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from the disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A light source module, configured to provide an illumination beam, wherein the light source module comprises:
   a first light source;
   a second light source, disposed adjacent to the first light source module;
   a first heat sink structure, connected to the first light source, and having a plurality of first heat sink fins; and
   a second heat sink structure, connected to the second light source, and having a plurality of second heat sink fins, wherein the first light source and the second light source are disposed along a first direction, the first heat sink structure and the second heat sink structure are disposed along the first direction, the plurality of first heat sink fins are arranged along the first direction, the plurality of second heat sink fins are arranged along a second direction, and the first direction is substantially perpendicular to the second direction.

2. The light source module as claimed in claim 1, wherein an included angle between the first direction and the second direction is between 85 degrees and 95 degrees.

3. The light source module as claimed in claim 1, wherein a width of a first side of each of the plurality of second heat sink fins away from the second light source is less than a width of a second side of each of the plurality of second heat sink fins adjacent to the second light source.

4. The light source module as claimed in claim 1, wherein the light source module comprises a first fan, the first fan is configured to correspond to the first heat sink structure and the second heat sink structure, wherein the first fan provides a portion of an airflow to the first heat sink structure, and provides another portion of the airflow to the second heat sink structure.

5. The light source module as claimed in claim 1, wherein the light source module comprises a first fan and a second fan, the first fan is configured to correspond to the first heat sink structure, and the second fan is configured to correspond to the second heat sink structure, wherein the first fan provides a first airflow to the first heat sink structure, and the second fan provides a second airflow to the second heat sink structure.

6. The light source module as claimed in claim 1, wherein the first light source is configured to emit a first light beam, the second light source is configured to emit a second light beam, the first light beam is blue light or green light, and the second light beam is red light.

7. The light source module as claimed in claim 6, wherein a direction of the first light beam is the same with a direction of the second light beam.

8. The light source module as claimed in claim 7, wherein the light source module comprises a third light source and a third heat sink structure connected to the third light source, and the third light source is configured to emit a third light beam, wherein the third light beam is green light, and a direction of the third light beam is opposite to the direction of the first light beam.

9. The light source module as claimed in claim 8, wherein the light source module comprises a fourth light source configured to emit a fourth light beam, the fourth light beam is blue light, the fourth light source is disposed between the second light source and the third light source, wherein a direction of the fourth light beam is perpendicular to the direction of the second light beam and the third light beam.

10. A projection apparatus, comprising:
a light source module, configured to provide an illumination beam and comprising:
a first light source;
a second light source, disposed adjacent to the light source module;
a first heat sink structure, connected to the first light source, and having a plurality of first heat sink fins; and
a second heat sink structure, connected to the second light source, and having a plurality of second heat sink fins, wherein the first light source and the second light source are disposed along a first direction, the first heat sink structure and the second heat sink structure are disposed along the first direction, the plurality of first heat sink fins are arranged along the first direction, the plurality of second heat sink fins are arranged along a second direction, and the first direction is substantially perpendicular to the second direction;
a light valve, located on a transmission path of the illumination beam and configured to convert the illumination beam into an image beam; and
a projection lens, located on a transmission path of the image beam and configured to project the image beam to an outside of the projection apparatus.

11. The projection apparatus as claimed in claim 10, wherein an included angle between the first direction and the second direction is between 85 degrees and 95 degrees.

12. The projection apparatus as claimed in claim 10, further comprising a housing, wherein the light source module is configured in the housing, the housing comprises a top wall, a normal direction of the top wall is perpendicular to the first direction, and an area of an orthogonal projection of the second heat sink structure on the top wall is smaller than an area of an orthogonal projection of the first heat sink structure on the top wall.

13. The projection apparatus as claimed in claim 10, wherein a width of a first side of each of the plurality of second heat sink fins away from the second light source is less than a width of a second side of each of the plurality of second heat sink fins adjacent to the second light source.

14. The projection apparatus as claimed in claim 10, wherein the light source module comprises a first fan, the first fan is configured to correspond to the first heat sink structure and the second heat sink structure, wherein the first fan provides a portion of an airflow to the first heat sink structure, and provides another portion of the airflow to the second heat sink structure.

15. The projection apparatus as claimed in claim 10, wherein the light source module comprises a first fan and a second fan, the first fan is configured to correspond to the first heat sink structure, and the second fan is configured to correspond to the second heat sink structure, wherein the first fan provides a first airflow to the first heat sink structure, and the second fan provides a second airflow to the second heat sink structure.

16. The projection apparatus as claimed in claim 10, wherein the first light source is configured to emit a first light beam, the second light source is configured to emit a second light beam, the first light beam is blue light or green light, and the second light beam is red light.

17. The projection apparatus as claimed in claim 16, wherein a direction of the first light beam is the same with a direction of the second light beam.

18. The projection apparatus as claimed in claim 17, wherein the light source module comprises a third light source and a third heat sink structure connected to the third light source, and the third light source is configured to emit a third light beam, wherein the third light beam is green light, and a direction of the third light beam is opposite to the direction of the first light beam.

19. The projection apparatus as claimed in claim 18, wherein the light source module comprises a fourth light source configured to emit a fourth light beam, the fourth light beam is blue light, the fourth light source is disposed between the second light source and the third light source, wherein a direction of the fourth light beam is perpendicular to the direction of the second light beam and the third light beam.

* * * * *